3,644,348
PROCESS FOR THE PREPARATION OF 6-CHLORO-7-SULFAMYL, 3-POSITION SUBSTITUTED-3,4-DIHYDRO-1,2,4-BENZOTHIADIAZINE-1,1-DIOXIDE
Tsutomu Irikura, 72 Shimura Nakadaimachi, Itabashi-ku, Tokyo, Japan, and Seigo Suzue, 97, 1-chome, Kohan, Okaya-shi, Nagano-ken, Japan
Continuation of application Ser. No. 574,371, Aug. 23, 1966, which is a continuation-in-part of application Ser. No. 100,512, Apr. 4, 1961. This application Apr. 25, 1969, Ser. No. 820,701
Claims priority, application Japan, Mar. 4, 1961, 36/7,520; Mar. 6, 1961, 36/7,636
Int. Cl. C07d 93/34
U.S. Cl. 260—243 D   5 Claims

ABSTRACT OF THE DISCLOSURE

This invention relates to 6-chloro-7-sulfamyl, 3-position substituted-3,4-dihydro-1,2,4 - benzothiadiazine - 1,1-dioxide of

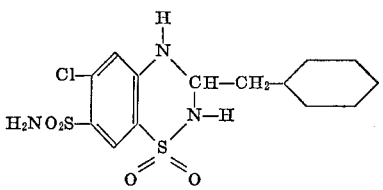

Figure 1:
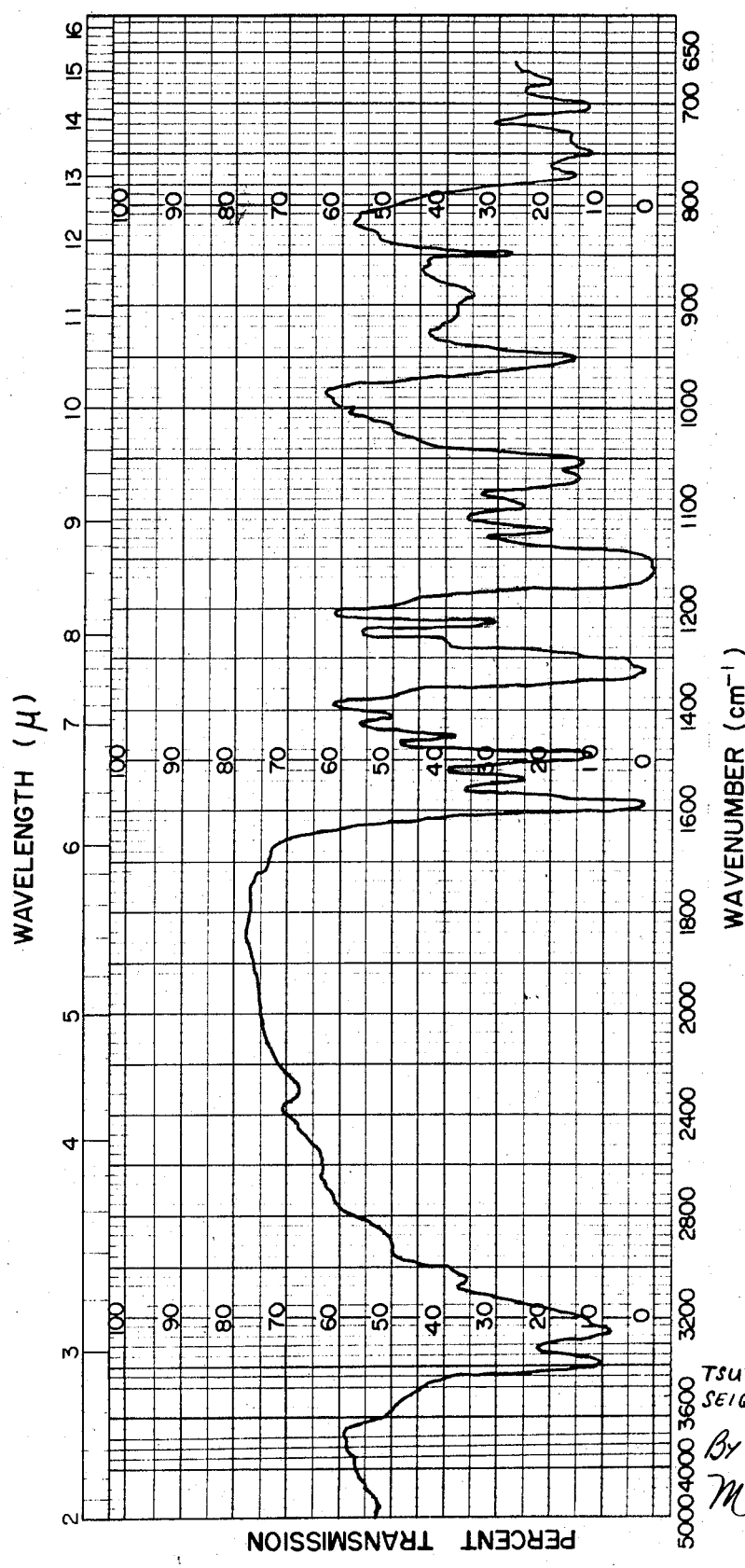

The compound exhibits remarkable diuretic and blood pressure lowering effects. The invention also relates to processes of preparing the above compound.

---

This application is a continuation of application Ser. No. 574,371 filed Aug. 23, 1966, which, in turn, was a continuation-in-part of application Ser. No. 100,512, filed Apr. 4, 1961. The application claims the priority of corresponding Japanese applications of Apr. 13, 1960, Mar. 4, 1961, and Mar. 6, 1961.

In general, 6-chloro-7-sulfamyl benzothiadiazine-1,1-dioxide and 6-chloro-7-sulfamyl-3,4-dihydro benzothiadiazine, 1,1-dioxide have been reported by Novells & Sprague and other researchers in the Journal of American Chemical Society 79, 2028 (1957) and the Experientia 14 463 (1958), from which their effects on urination and lowering of blood pressure are known.

One object of the present invention is to provide 3 position-substitution products of said 6-chloro-7-sulfamyl-3,4-dihydro benzothiadiazine-1,1-dioxide. Such products are represented by the following formula:

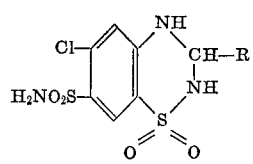

Wherein, R is alkyl, aryl, alkyl-aryl, aryl-alkyl, alkoxy-aryl, alkoxyaryl-alkyl, pyridazyl or p-alkoxy-pyridazyl.

The invention is particularly directed to the novel compound (I)

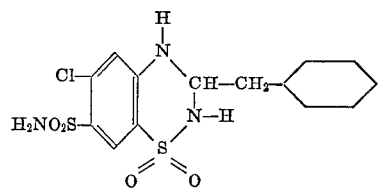

having a melting point of 269–271° C. This compound has exceptional diuretic and blood pressure lowering effects.

The present invention is based on the discovery that certain 3-position substitution products of said 6-chloro-7-sulfamyl-3,4-dihydrobenzothiadiazine-1,1 - dioxide have stronger effects on urination and lowering of blood pressure than any of the 6-chloro-7-sulfamyl-benzothiadiazine-1,1-dioxide and 6-chloro-7-sulfamyl-3,4-dihydrobenzothiadiazine-1,1-dioxide. Among these 3-position substitution products particularly extraordinary diuretic and blood pressure lowering effects are observed if the substituent is benzyl and p-methoxybenzyl. The 3-position benzyl substitution product of 6-chloro-7-sulfamyl-3,4-dihydro benzothiadiazine-1,1-dioxide and 3-position p-methoxybenzyl substitution product of the same are physiologically active products being more than 100 times as effective than 6-chloro-7-sulfamyl-benzothiadiazine-1,1-dioxide and 5 times more effective than 6-chloro-7-sulfamyl-3,4-dihydro benzothiadiazine-1,1-dioxide.

Another object of the invention is to provide novel processes for obtaining said substitution products in pure state with high yield.

In the prior art, 4-amino-6-chloro-1,3-disulfamylbenzene is condensed with formaldehyde or aldehyde designated by R—CHO according to the following:

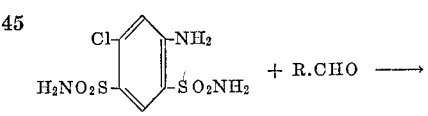

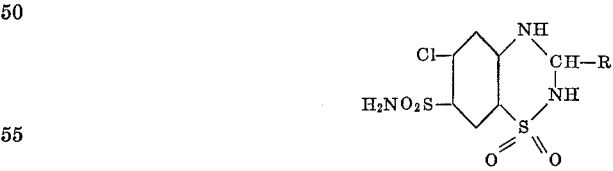

wherein R represents H or

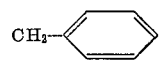

However, according to this process, the aromatic aldehyde is so unstable that it cannot be stored as raw material and is largely reduced by refining distillation.

The processes of the invention are novel and entirely different from above condensation process.

According to one of the inventive processes, 4-amino-6-chloro-1,3-disulfamylbenzene, the starting raw material, is condensed with ester of allylcarbamate or styrylcarbamate, as follows:

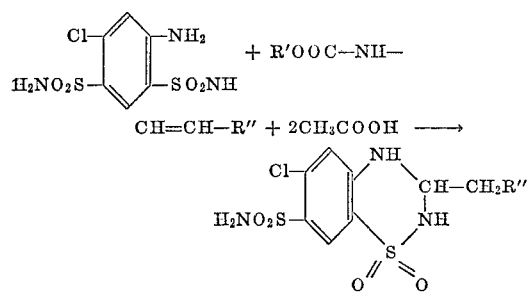

wherein:

R' represents methyl or ethyl
R" represents hydrogen or methyl, an aromatic group or a heterocyclic group such as pyridazyl.

As aromatic group, for instance, phenyl, paramethoxyphenyl etc., and as heterocyclic group, pyridazyl or p-methoxypyridazyl and the like are used.

When the substitution radical or group is combined with the carbon at the 3-position of benzothiadiazine, the unstable aldehyde is not used, but the very reactive carbon double bond is utilized, and when the aliphatic group such as 1,2-propenyl amino carbamateester is used, the product having an ethyl group at 3-position is obtained. When styrylcarbamate methylester is used, a benzyl substitution group is introduced at the 3-position, and similarly heterocyclic compounds such as pyridazyl substitution radical or group may be obtained. Also aromatic and heterocyclic compounds having a substitution radical such as methoxy radical at paraposition will react similarly, so that optional substitution radicals may be combined with benzothiadiazine at 3-position.

The compounds represented by

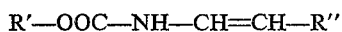

which are utilized in the above condensation may be synthesized in a simple manner in one process. For example, when the benzyl radical is introduced, first 150 cc. of 95% water solution of sodium hydroxide is added with five times the amount of ice; then about half the amount (55 g.) of chlorine gas is introduced, to prepare 1 litre of solution in total.

Separately, 147 g. of cinnamic acid amide are dissolved in 125 cc. of methanol, to which 130 cc. of NaOCl solution prepared as above is added. The mixture is then heated by a hot bath to deposit scaly crystals. These crystals are gathered by cooling rapidly and washed by a mixed solution of methanol and water of same amount; thus white crystals with a yield of 70% and a melting point of 119°C. are obtained.

In this manner, methylstyrylcarbamate may be prepared in one process, so that this process is very advantageous compared with the prior art process in which, the benzylaldehyde which is synthesized in a simple manner, will during use be reduced by half upon refining distillation.

In another process of the invention, 4-amino-6-chloro-1,3-disulfamylbenzene is reacted with phenylglycidic acid which is considered as styreneoxide, styreneoxide or styrylacetate which corresponds to such a compound wherein nitrogen is substituted by oxygen, thus constitutionally comparing with carbamate.

These raw materials used in the invention may be derived from benzaldehyde in a comparatively simple process and the products are stable.

One of the characteristics is that those unstable aldehydes, particularly such as phenylacetaldehyde, are not used, contrary to the prior art process of condensation of benzothiadiazine.

Another characteristic is that when the ring of benzothiadiazine is closed, completely anhydrated raw material and solvent must be used in the prior art process, while condensation ring closure is effectively carried out in aqueous solution in the process of this invention, particularly in a process wherein styrylacetate is used, and the condensing operation is simple whereby high purity end products are rapidly obtained.

The process of this invention will be shown in reaction formulae as follows.

Process A (oxide of phenylglycidic acid or of styreneoxide etc. is used)

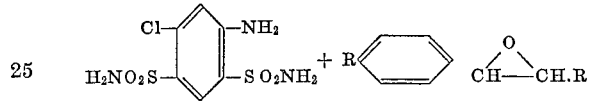

oxide 4-amino-6-chloro-1,3-disulfamyl benzene

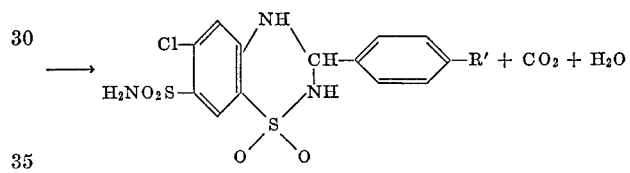

wherein,

R: styreneoxide in case of hydrogen, phenylglycidic acid in case of —COOH
R': hydrogen or alkoxy radical Process B (styrylacetate is used)

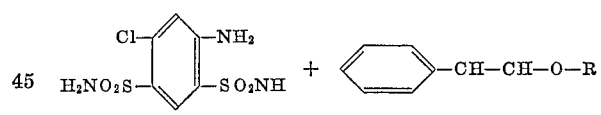

styrylacetate 4-amino-6-chloro-1,3-disulfamyl benzene

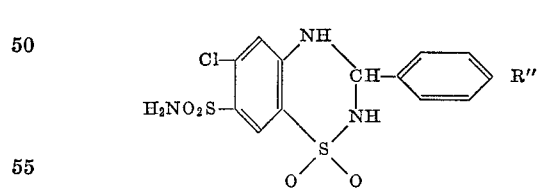

where,

R: alkyl radical of $CH_3$ etc., carboalkoxy radical of $COCH_3$ etc., aryl, or carboaryloxy radical (Co. Ar)
R': hydrogen or alkoxy radical In this way, benzothiadiazine having a 3-position substitution radical or group, particularly benzyl or its substitution products, for instance compounds of p-methoxybenzyl etc. are prepared by utilizing rich reactive oxide or double bond.

The raw materials, such as phenylglycidic acid, which are used in the process of this invention, may be obtained in such a way that from benzaldehyde, chloroacetic acid ethylester and sodium amide, ethyl-phenylglycidate is prepared in one process, then it is hydrolysed with sodium ethylate.

And, styreneoxide may be prepared directly from styrene and perbenzoic acid. (Cf. Organic Synthesis Collective volume 1, p. 538.)

Further, styrylacetate used in the Process B may be obtained in such a way that benzalacetone, which is obtained by combining benzaldehyde and acetone, is treated with peracetic acid. (Cf. Continued, Biographical Organic Chemical Reaction, p. 213.)

Thus, in either case, the above raw materials are the chemical compounds which may be obtained comparatively simply, so that 3-position substituted benzothiadiazine may be prepared with industrial advantages.

Still another synthetic process of the invention relates to preparation of benzothiadiazine substitutes which have particularly excellent effects on urination and lowering of blood pressure, having the object of obtaining with high yield pure 6-chloro-7-sulfamyl-3-benzyl-3,4-dihydro-1,2,4-benzothiadiazine-1,1-dioxide.

The products obtained by the invention have elementary analysis values, i.e. the calculated values being N:10.70, C:43.62, H:3.87, while experimental values are N:10.85, C:43.4, H:3.65, which are within the limits of experimental error. And, when it is mixed and melted with the products prepared by the inventor in the first synthetic process, 4-amino-6-chloro-1,3-disulfamylbenzene is condensed with

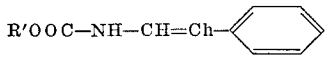

there is found no lowering of melting point.

As the result of biological tests conducted with this substance, it has been found that the substance is 3 to 6 times as powerful as the hydrochlorothiazide.

Some examples of the present invention are described hereinbelow, however, it is to be understood that the present invention is not limited to these examples.

EXAMPLE 1

70 g. of 4-amino-6-chloro-1,3-disulfamylbenzene and 45 g. of methylstyrylcarbamate are dissolved in a mixture of 500 cc. of dimethylcellosolve, diethyleneglycol dimethylether and 500 cc. of glacial acetic acid. The mixture is then boiled for 12 hours on an oil bath. The solvent is then recovered by vacuum treatment, crystals of the residue are gathered, and nonreacted 4-amino-6-chloro-1,3-disulfamylbenzene is extracted with 5 litres of hot water. The extract is then filtered while hot and undissolved substance is dissolved in 500 cc. of acetone, to which 100 cc. of glacial acetic acid are added. As the acetone is distilled off, crystals of a white amorphous powder are deposited. The contents are cooled and the crystals are filtered upon termination of the acetone distillation.

These crystals are dissolved in a liquid of 5% sodium hydroxide and treated with bone charcoal, whereupon a white solution is formed. When this solution is neutralized with concentrated hydrochloric acid, a white product is deposited, which is then dried at 100° C. This product has a melting point of 269° C. and a yield of 35 g. (36.3%) is ascertained.

EXAMPLE 2

4 g. of the sodium salt of phenylglycidic acid and 5.6 g. of 4-amino-6-chloro-1,3-disulfamylbenzene are added to a mixed solution, comprising 30 cc. of glacial acetic acid and 56 cc. of a liquid which is prepared by diluting 12 cc. of concentrated hydrochloric acid in 800 cc. The solution is boiled mildly on an oil bath. When the solution is about to boil, suspended crystals are completely dissolved. After 2–3 minutes, carbon dioxide gas is evolved and the liquid becomes gradually cloudy. After refluxing the liquid by heating for one hour and a half, crystals deposited from the liquid are removed by filtration and washed with hot water to obtain the end product.

By cooling the filtrate, unreacted 4-amino-6-chloro-1,3-disulfamylbenzene is recovered therefrom.

The thus obtained crystals have a melting point of 260 to 264° C. and a purity of more than 98%. If higher purity values are required, the crystals are dissolved in dimethylformamide, to which 7 times the amount of chloroform is added and the mixture is left to stand over night. Thus, 2.9 g. of the end product having a melting point of 269° C. are obtained (yield 33.2%).

EXAMPLE 3

6 g. of styreneoxide and 14 g. of 4-amino-6-chloro-1,3-disulfamylbenzene are dissolved in 100 cc. of diethyleneglycol dimethylether, to which 0.2 cc. of concentrated hydrochloric acid are added. The mixture is subjected to heating and refluxing for 4 hours. The solvent is then recovered under reduced pressure, and the residue is admixed with 50 cc. of glacial acetic acid and left over night. The crystals are then gathered. These crystals are treated with 500 cc. of hot water and nonreacted 4-amino-6-chloro-1,3-disulfamylbenzene is extracted and removed. Undissolved product is then dissolved in dimethylformamide, to which 7 times the amount of dichloromethane is added and left over night. White powder crystals are deposited. 8 g. of the end product having a melting point 269° C. are obtained, the yield being 44%.

EXAMPLE 4

3 g. of styrenacetate and 5 g. of 4-amino-6-chloro-1,3-disulfamylbenzene are heated in 30 cc. of glacial acetic acid and 50 cc. of 20% oxalic acid at 120° C. on an oil bath for one hour. The solution which is first clear again becomes cloudy with the deposition of powder-like crystals. Then the reacted liquid is filtered out while hot and the crystals are thoroughly washed with hot water. The filtrate is then cooled in the atmosphere and unreacted 4 - amino - 6-chloro-1,3-disulfamylbenzene is recovered. The product consists of white crystals having a purity of more than 98%. The melting point is between 260–264° C. and the weight is 4.6 g. (yield 68%). When the product is recrystallized, a product having a melting point of 269° C. is obtained.

EXAMPLE 5

12.5 g. (0.043 mol) of 4-amino-6-chloro-1,3-disulfamylbenzene and 5.2 g. (0.044 mol) of phenylacetaldehyde (small excess amount) are dissolved in 70 cc. of glacial acetic acid (or further with or without dimethylcellosolve) and heated and refluxed for 20 hours. The mixture is then cooled on the atmosphere and the deposited crystals are filtered out to obtain a crude product.

This product is dissolved in 500 cc. of acetone and admixed with 100 cc. of glacial acetic acid. The acetone is distilled off on a water bath, and crystals are deposited. In this way, after five recrystallizations, the crystals are converted into white powder-like crystals, having a melting point of 269° C. with a yield of 13.8 g. (81%).

The thus obtained above crystals exhibit a remarkable diuretic as well as blood pressure lowering effect, when 8 mg.–16 mg. thereof are administered daily to the human body.

The inventive compound of Formula I, which has found wide application in Japan for the medical purposes indicated, is a white crystalline water insoluble powder which, however, is soluble in dimethylformamide and N-vinyl pyrrolidone. The ultraviolet spectrum was determined by dissolving the compound in alcohol and pouring the solution into a couvette of 1 cm. width. It was found that the maximum absorption is at 226.5 and 271 mµ.

EXAMPLE 6

Physiological activity tests of Formula I compounds (A) Na-excreting effect of the compound on rats.—
This test was performed according to the method described by Chart (Schweiz. Med. Wschr. 89 (12) 323–330 (1959)). The results of the tests are tabulated below:

TABLE I

| No. | Dosage, mg./kg. | Na, meq. | K, meq. | Urine volume |
|---|---|---|---|---|
| 1 | (¹) | 1.080 | 0.0468 | 1.8 |
| 2 | 0.005 | 2.015 | 0.0891 | 1.3 |
| 3 | 0.02 | 5.415 | 0.2543 | 1.9 |
| 4 | 0.08 | 10.036 | 0.4360 | 3.4 |
| 5 | 0.31 | 18.760 | 0.8156 | 6.7 |
| | | (6 rats average) | | |

¹ Control.

Rats weighing about 100 grams each were used and no food was given to the rats for eighteen hours. Thereafter, 5 ml. of 0.9% NaCl solution was introduced into the rats, followed by the administration of the inventive substance. The Na of the urine obtained within three hours following the administration of the drug was determined by using a flame-photometer designed by the Japanese firm Hitachi Co., Ltd.

It was found that the inventive substance is ten times as effective as hydrochlorothiazide if a small amount is administered and twenty-eight times as effective if substantial amounts are administered.

(B) Diuretic action.—As the effect of prior art diuretic agents varies according to their specific properties, diuresis had previously to be maintained by their alternate use. Acetazolamide has some shortcomings, for example, if it is administered to the patient for a prolonged period of time, the drug acidifies the body fluid as a result of the strong inhibition of carbonic anhydrase caused by the drug. Furthermore, the body gets used to this drug and the drug loses its effect after some time. Mercurial diuretics, on the other hand, produce hypochloromic alkalosis after prolonged administration because of the increase of Cl excretion.

The compound of the present invention overcomes these drawbacks and causes only a slight decrease in the bicarbonate and potassium level of the plasma, so that even after prolonged administration, no disturbance in the electrolyte balance can be observed. Further, and very importantly so, the inventive substance combines the advantageous properties of mercurial diuretics and those of carbonic anhydrase inhibitors and its diuretic effect is more than a dozen times as great as that of hydrochlorothiazide.

(C) The result of experiments performed on human beings have been tabulated in Table II attached hereto. In persons of normal health, the increase in potassium, sodium and chlorine ions was marked, although it varied in dependence on the accumulation of water and intake of sodium. The lowest effective dose for humans was found to be 4 mg./50 kg.

(D) Toxicity.—This was determined by using rats. Rats were given orally 100 mg./kg. of the inventive compound for 31 days with daily doses. At the end of this period, the animals were histologically examined. No pathohistological findings could be ascertained in either the liver, the kidneys or the spleen. Therefore, it can reasonably be assumed that the danger of chronic toxicity is negligible, if not absent.

| | Route of Administration | |
|---|---|---|
| Hydrochlorothiazide | Intra peritoneal, mg./kg. | 1,880 |
| Inventive compound | Intra peritoneal, g./kg. | 21.5 |
| Do | Oral, g./kg. | 30.0 |

As illustrated in the above table, acute toxicity caused by this compound is far less than that caused by hydrochlorothiazide.

EXAMPLE 7

Comparison tests

Compounds which upon first glance may be considered identical or equivalent to the compound of Formula I above have been disclosed in the following publications: Luxembourg Pat. 36,956 (Example 15) De Stevens 3,163,645 (Example 20) and Werner et al., Journ. Amer. Chem. Soc., volume 82, pages 1161–1166.

A careful study of the teachings of these publications and the results of comparison tests performed, however, conclusively demonstrate that these prior art compounds do not in fact possess the structure of the compound of Formula I.

All of these references indicate that the melting point of their respective compound is considerably lower than the melting point of the compound of Formula I. Werner et al. thus discloses a melting point of 247–250° C. which is confirmed by the two patents referred to. This is in contrast to the considerably higher melting point of 269–271° C. of the compound of Formula I. The difference in melting points thus clearly strengthens the presumption that different compounds were in fact obtained by the prior art researchers. The presumption is confirmed by the following experiments.

Materials and methods of experiment (a) Synthesis.—The compound of Formula I synthesized according to the teachings of this application was purified by repeated recrystallization in ethyleneglycol-monomethylether and glacial acetic acid until no rise of melting point was observed. This substance is designated hereinafter as (100512).

The substance synthesized according to Example 20 of U.S. Pat. No. 3,163,645, Example 15 of Luxembourg Pat. 36,956 and Werner et al., was purified by repeatedly dissolving it in dimethylformamide and crystallization in water until a constant melting point was obtained. This substance is designated hereinafter as (Stevens).

(b) Elementary analysis.—The contents of C, H and N were determined and the melting points of (100512) and (Stevens) were measured.

(c) IR and UV spectra.—The IR spectra were measured with an infrared spectrometer, model S, Japan Spectroscopic Co. using KBr tablets. The UV spectra of ethanolic solutions were measured with a spectrophotometer, model EPS-2U, Hitachi Manufacturing Co.

(d) Biological assay.—Three groups of female Wistar rats (average weight 160 g.), each group consisting of five members, were kept without water and food for 18 hours. (100512) and (Stevens) were suspended in a 0.1% CMC solution with a glass homogenizer. 1 mg./kg. of (100512) in suspension was orally administered with a delivering tube to each member of a group, 1 mg./kg. of (Stevens) to each member of a separate group, and at the same time 5 ml. of a 0.2% NaCl solution to all members. Urine was taken from 0 through 3 hours and from 3 through 6 hours separately. Total volume of urine and the contents of Na, K and Cl were measured, Na and K with Hitachi Flame Spectrophotometer, Model FDF-2 and Cl by the argentimetric titration after Sifer Hughes, J. Biol. Chem. 146, 529 (1942).

(a) Results:

| | 100512 | (Stevens) |
|---|---|---|
| Appearance | White crystals | Yellow powder. |

(b) Analysis and melting points:

| | (100512) | | (Stevens) |
|---|---|---|---|
| | Calcd. | | |
| Percent: | | | |
| C | 43.35 | ¹ 43.23 | ² 39.12 |
| H | 3.64 | ¹ 3.49 | ¹ 3.47 |
| N | 10.82 | ² 10.22 | ¹ 10.91 |
| M.P., ° C | | 270–272 | 247–250 |

¹ Found values well agree with the calculated within the experimental errors.
² Discrepancy between found and calculated values.

The analysis in this laboratory always results in lower nitrogen content of sulfonamide than calculated.

Figure 2:
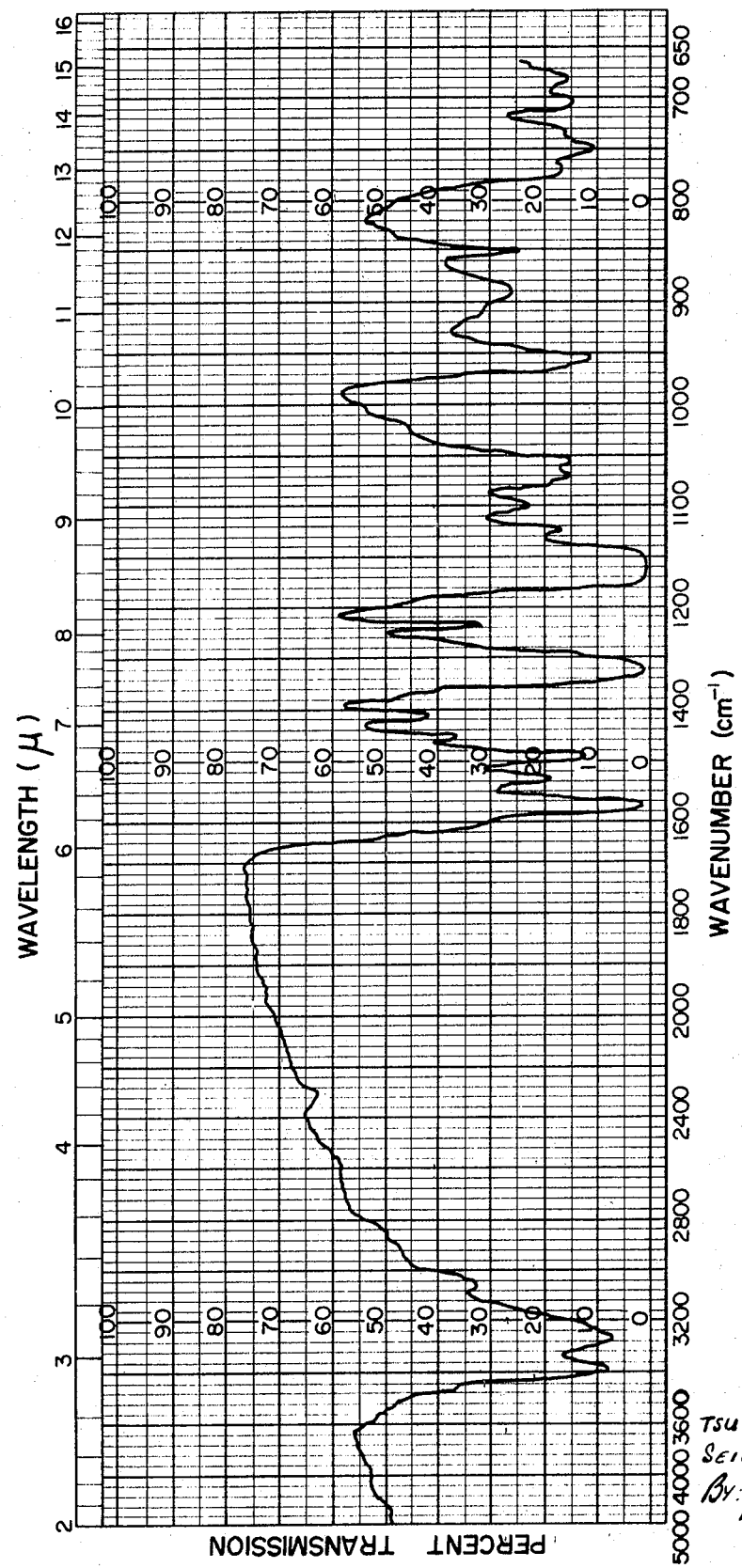

(c) IR and UV spectra.—The infrared spectra are shown in FIGS. 1 and 2. It is noteworthy that, although for the most part they coincide, C=N in the wave number range 1640–1696 is explicity present in the (Stevens) spectrum in FIG. 2, while absent in FIG. 1.

The ultraviolet spectrum of (Stevens) shifts toward shorter wave length by 2 mµ compared with that of (100512).

(d) Biological assay:
  (i) Urine volume.—The urine volumes in 0 through 3 hours and 3 through 6 hours are shown in Table I.

TABLE I
[Urine volumes (ml.)]

| Control group | | (100512 group) | | (Stevens group) | |
| --- | --- | --- | --- | --- | --- |
| 0–3 hr. | 3–6 hr. | 0–3 hr. | 3–6 hr. | 0–3 hr. | 3–6 hr |
| 3.6 | 1.0 | 6.0 | 1.0 | 4.0 | 1.1 |
| 4.5 | *0 | 6.2 | 0.5 | 4.5 | 2.0 |
| 3.4 | *0 | 7.2 | *0 | 3.6 | *0 |
| 3.6 | 0.8 | 6.0 | 1.0 | 6.4 | 1.1 |
| 4.5 | *0 | 6.3 | 1.5 | 4.8 | 1.0 |
| 3.92 | 0.36 | 6.34 | 0.8 | 4.66 | 1.04 |
| +0.53 | +0.41 | +0.50 | +0.55 | +1.07 | +0.70 |
| Variance: | | | | | |
| Fo | | 1.18 | 1.8 | 3.85 | 3.0 |
| To | | 6.05 | 1.2 | 1.23 | 1.7 |
| | | S | NS | NS | NS |
| | | P=0.01 | | | |

*Trace quantity not measurable.

NOTE.—The increase of urine volume was highly significant for 100512 administration compared to control at the level P=0.01, while the diuretic effect of (Stevens) cannot be concluded. S means significant. NS means non-significant.

(ii) Na and K.

TABLE II
[Concentration of Na and K in urine from 0 through 3 hours (mg./ml. urine)]

| Control group | | (100512) group | | (Stevens) group | |
| --- | --- | --- | --- | --- | --- |
| Na | K | Na | K | Na | K |
| 0.270 | 0.423 | 0.780 | 0.825 | 1.095 | 0.824 |
| 0.380 | 0.615 | 0.946 | 0.526 | 0.765 | 0.668 |
| 0.305 | 0.267 | 0.812 | 0.383 | 0.028 | 0.866 |
| 0.165 | 0.180 | 0.477 | 0.590 | 0.728 | 1.148 |
| 0.134 | 0.510 | 0.789 | 0.834 | 0.946 | 1.143 |
| ¹0.250 | ¹0.415 | ¹0.764 | ¹0.482 | ¹0.889 | ¹0.957 |
| Na:K | | | | | |
| 1:1.66 | | 1:0.63 | | 1:1.07 | |

¹ Mean.

TABLE III
[Total amount of Na and K in urine from 0 through 3 hours]

| Control group | | (100512) group | | (Stevens) group | |
| --- | --- | --- | --- | --- | --- |
| Na | K | Na | K | Na | K |
| 0.972 | 1.523 | 4.680 | 4.950 | 4.380 | 3.295 |
| 1.710 | 2.765 | 5.860 | 3.260 | 3.440 | 3.050 |
| 1.037 | 0.908 | 5.850 | 2.760 | 3.700 | 3.115 |
| 0.594 | 0.648 | 2.865 | 3.540 | 4.660 | 7.350 |
| 0.604 | 2.295 | 4.970 | 5.250 | 4.540 | 5.490 |
| ¹0.983 | ¹1.628 | ¹4.845 | ¹3.592 | ¹4.114 | ¹4.460 |
| ±0.455 | ±0.898 | ±1.226 | ±1.090 | ±0.541 | ±1.905 |

¹ Mean.

The difference in the amount of Na and K excretion caused by (100512) and (Stevens) administration as compared to control was significant.

TABLE IV
[Concentrations of Cl in urine]

| | Control | (100512) | (Stevens) |
| --- | --- | --- | --- |
| Cl' mg./100 ml. urine | 94.49 | 178.86 | 168.73 |
| | 84.37 | 209.23 | 188.98 |
| | 60.74 | 151.86 | 202.48 |
| | 60.74 | 161.98 | 192.35 |
| | 67.49 | 222.73 | 293.59 |
| Mean | 73.57 | 184.93 | 209.23 |
| | ±15.17 | ±30.35 | ±48.73 |
| Cl'mg./total urine | 3.31 | 10.73 | 6.75 |
| | 3.80 | 12.97 | 8.50 |
| | 2.07 | 10.93 | 7.29 |
| | 2.19 | 9.73 | 12.31 |
| | 3.04 | 14.03 | 14.09 |
| Mean | 2.88 | 11.68 | 9.79 |
| | ±0.74 | ±1.77 | ±3.24 |

DISCUSSION

The difference of melting points between (100512) and (Stevens) is distinct and needs no further discussion. The difference in appearance, white (100512) and yellow (Stevens), also remains after recrystallization. Samples of both compounds are available.

The article of J. G. Topliss and others (J. Org. Chem. 26, 3842 (1961)) should be referred to.

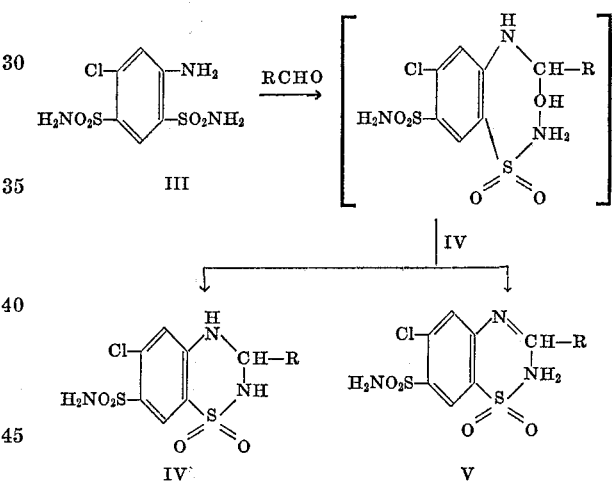

The authors set forth in the cited article that an anil of the structure V might be formed dependent of the condition of reaction which showed the stretching vibration of C=N (6.08µ) in the infrared absorption spectrum and a broad absorption at 266–300 mµ in the ultraviolet spectrum, and that the substance of the structure IV showed absorptions at 266–275 mµ ($\epsilon$=19.000–28.000) and 310–320 mµ ($\epsilon$=2000–8000).

The substance (Stevens) obtained in this experiment decisively contains the anil of structure V, since it exhibits absorption at 6.08µ due to C=N stretching and the UV spectrum shifts to a small extent toward 250 mµ. The anil may probably be mixed with the substance of structure IV because the absorption at 310–320 mµ ($\epsilon$=2000–8000) did not disappear.

The elementary analysis gives no information because the substances IV and V have an identical elementary composition.

In addition, as is seen in the result of biological assay, the increase in the amount of urine is highly significant ($p$=0.01) with (100512), while not with (Stevens), as compared with control. The substance (Stevens), however, does increase the excretion of salts, Na⁺, K⁺ and Cl⁻, though not remarkably compared with the control. But not only the total amount of urine excreted is less with (Stevens) than with (100512), but also the ratio of K to Na is 1.07 with the former, while 0.63 with the

TABLE II

[Na, K, Cl excreting effects of the 6-chloro-7-sulfamyl-3-benzyl-3,4-dihydro-1,2,4-benzothiadiazine-1,1-dioxide in the human]

| Number | Dosage, mg./kg. | Urine volume, cc. | | | Na excretion, mEq. | | | K excretion, mEq. | | | Cl' excretion, mEq. | | | Urine pH | | Na/K | |
|---|---|---|---|---|---|---|---|---|---|---|---|---|---|---|---|---|---|
| | | Before | After | After/Before | Before | After | After/Before | Before | After | After/Before | Before | After | After/Before | Before | After | Before | After |
| 1 | 0.370 | 560 | 820 | 1.46 | 76.5 | 112.3 | 1.46 | 16.3 | 19.9 | 1.22 | 97.0 | 147.8 | 1.52 | 5.5 | 5.75 | 4.69 | 5.64 |
| 2 | 0.270 | 200 | 610 | 3.05 | 60.0 | 122.0 | 2.00 | 12.6 | 19.1 | 1.51 | 75.5 | 230.0 | 1.71 | 5.78 | 5.40 | 4.82 | 6.38 |
| 3 | 0.217 | 190 | 452 | 2.37 | 52.0 | 56.9 | 1.10 | 10.6 | 10.0 | 0 | 60.8 | 142.4 | 2.34 | 7.00 | 5.50 | 4.90 | 5.69 |
| 4 | 0.185 | 280 | 821 | 2.93 | 60.8 | 120.9 | 1.98 | 8.0 | 17.6 | 2.20 | 73.7 | 215.4 | 2.92 | 7.10 | 6.10 | 7.60 | 6.86 |
| 5 | 0.185 | 190 | 575 | 3.55 | 28.9 | 50.0 | 1.73 | 7.5 | 14.0 | 1.86 | 37.9 | 68.5 | 1.54 | 6.1 | 6.1 | 3.85 | 3.57 |
| 6 | 0.175 | 105 | 396 | 3.64 | 34.9 | 53.3 | 1.52 | 3.9 | 7.1 | 1.82 | 48.9 | 121.1 | 2.47 | 5.8 | 5.8 | 8.94 | 7.50 |
| 7 | 0.089 | 350 | 724 | 2.06 | 66.1 | 83.4 | 1.26 | 6.0 | 8.5 | 1.41 | 99.0 | 204.2 | 2.06 | 5.6 | 5.5 | 11.0 | 9.8 |
| 8 | 0.083 | 260 | 510 | 1.96 | 39.0 | 72.0 | 1.86 | 7.3 | 11.5 | 1.60 | 50.0 | 93.6 | 1.87 | 6.1 | 5.9 | 5.3 | 6.15 |

Hydro-chloro thiazide

| 1 | 0.463 | 215 | 730 | 3.39 | 23.3 | 76.1 | 3.26 | 6.6 | 9.7 | 1.41 | 36.1 | 122.0 | 3.37 | 5.8 | 6.1 | 3.53 | 7.84 |
| 2 | 0.480 | 340 | 1015 | 3.08 | 48.7 | 103.7 | 2.12 | 9.8 | 16.7 | 1.76 | 65.9 | 116.1 | 1.76 | 5.70 | 6.1 | 4.96 | 6.20 |
| 3 | 1.041 | 370 | 1300 | 3.49 | 116.2 | 195.0 | 1.68 | 9.5 | 10.0 | 1.05 | 85.5 | 308.0 | 3.46 | 6.31 | 6.31 | 12.2 | 19.5 |
| 4 | 1.087 | 210 | 1045 | 6.19 | 44.7 | 122.7 | 2.94 | 8.0 | 13.4 | 1.67 | 57.0 | 133.7 | 2.34 | 5.90 | 6.50 | 5.58 | 7.15 | latter. As is well-known, the less potassium is excreted, the better is a diuretic.

Since the total amount of urine and the K to Na ratio, the most important factors in the biological assay, are definitely different with (100512) and (Stevens), the difference cannot be ascribed to difference solely of purity. Rather it may be reasonably concluded that the method described in (Stevens) does not produce pure 6-chloro-7-sulfamyl - 3-benzyl - 3,4-dihydro-1,2,4-benzothiadiazine-1,1-dioxide.

CONCLUSION

6 - chloro - 7 - sulfamyl - 3 - benzyl - 3,4 - dihydro-1,2,4 - benzothiadiazine - 1,1 - dioxide prepared by the process of this application was compared with the product of Stevens, Werner and others which appeared in J.A.C.S. 82, 1161 (1960). From the difference in the melting points, infrared and ultraviolet absorption spectra, it must be concluded that the latter was or contained a substance of the shown structure.

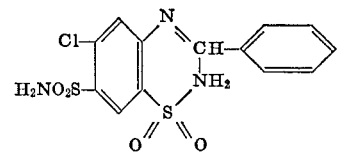

A definite difference was also observed in the biological diuretic effect and the ratio of potassium to sodium in urine.

What is claimed is:

1. A process of preparing 6 - chloro - 7 - sulfamyl-3 - benzyl - 3,4 - dihydro - 1,2,4-benzothiadiazine-1,1-dioxide having a melting point of 269 to 271° C., which comprises heating 4 - amino - 6 - chloro - 1,3-disulfamyl-benzene and a member selected from the group consisting of methylstyryl carbamate, an alkali salt of phenylglycidic acid, styrene oxide, styrene acetate, phenylacetoaldehyde and dimethyl Cellosolve in the presence of a solvent, and recovering the reaction product.

2. A process of preparing 6 - chloro - 7 - sulfamyl-3-benzyl - 3,4 - dihydro - 1,2,4 - benzothiadiazine - 1,1-dioxide which comprises dissolving 4 - amino - 6 - chloro-1 3 - disulfamyl-benzene and methylstyryl carbamate in a mixture of dimethyl Cellosolve and acetic acid, boiling the solution, and recovering the reaction product.

3. A proces of preparing 6 - chloro - 7 - sulfamyl-3-benzyl - 3,4 - dihydro - 1,2,4 - benzothiadiazine - 1,1-dioxide, which comprises dissolving 4 - amino - 6-chloro-1,3 - disulfamyl-benzene and an alkali salt of phenylglycidic acid in a mixed solvent consisting of acetic acid and diluted hydrochloric acid, boiling the solution, and recovering the reaction product.

4. A process of preparing 6 - chloro - 7 - sulfamyl-3 - benzyl - 3,4 - dihydro - 1,2,4-benzothiadiazine-1,1-dioxide, which comprises dissolving 4 - amino - 6 - chloro-1,3 - disulfamyl-benzene and styreneoxide in a mixed solvent consisting of dimethyl Cellosolve and a minor amount of hydrochloric acid, boiling the solution, adding acetic acid thereto, and recovering the reaction product.

5. A process of preparing 6 - chloro - 7 - sulfamyl-3-benzyl - 3 4 - dihydro - 1,2,4 - benzothiadiazine-1,1-dioxide which comprises dissolving 4 - amino - 6 - chloro-1,3 - disulfamyl-benzene and phenylacetoaldehyde in acetic acid, boiling the solution under reflux, and recovering the reaction product.

References Cited
UNITED STATES PATENTS 3,163,645    12/1964    De Stevens et al.  __  260—243 D NICHOLAS S. RIZZO, Primary Examiner U.S. Cl. X.R.

424—246

UNITED STATES PATENT OFFICE
CERTIFICATE OF CORRECTION

Patent No. 3,644,348    Dated February 22, 1972

Inventor(s) TSUTOMU IRIKURA and SEIGO SUZUE

It is certified that error appears in the above-identified patent and that said Letters Patent are hereby corrected as shown below:

In the heading of the patent, the claims of priority should read:

--application Japan April 13, 1960, 35/21,295; March 4, 1961, 36/7,520; March 6, 1961, 36/7,636--

Signed and sealed this 27th day of June 1972.

(SEAL)
Attest:

EDWARD M. FLETCHER, JR.
Attesting Officer

ROBERT GOTTSCHALK
Commissioner of Patents